Patented June 3, 1930

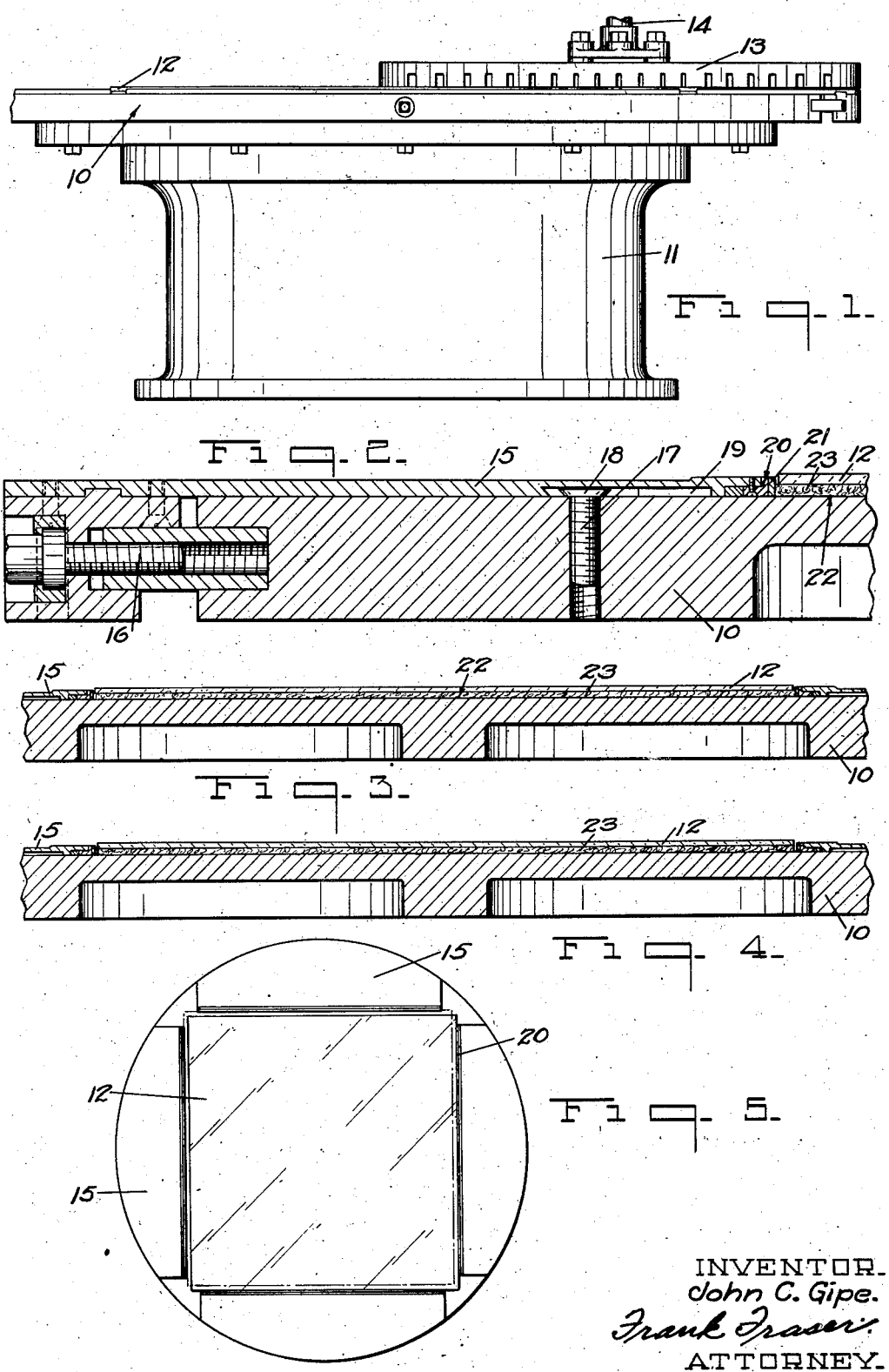
June 3, 1930.  J. C. GIPE  1,761,720
SHEET GLASS SURFACING TABLE
Filed June 24, 1925
INVENTOR.
John C. Gipe.
Frank Fraser
ATTORNEY.

1,761,720

UNITED STATES PATENT OFFICE

JOHN C. GIPE, OF TOLEDO, OHIO, ASSIGNOR TO LIBBEY-OWENS GLASS COMPANY, OF TOLEDO, OHIO, A CORPORATION OF OHIO

SHEET-GLASS-SURFACING TABLE

Application filed June 24, 1925. Serial No. 39,252.

The present invention relates to sheet glass surfacing apparatus, and has particular reference to a table adapted to support the sheet during the surfacing operations.

In the manufacture of plate glass, a blank is ground and polished upon both sides to remove any waves or surface distortions so that a clearer, true vision can be had when looking through the said plate. To do this it is necessary to support the plate glass blank during the surfacing operations in a manner that the opposite surfaces of the sheet will, after they have been ground and polished, be almost absolutely parallel to each other which means that the sheet must be of a uniform thickness throughout.

It is an aim of the present invention to provide a table for supporting the sheet during the grinding or polishing operations in a manner that both sides of the sheet can be ground and polished to produce an absolutely uniform sheet of plate glass.

Another object of the invention is to provide a table of this nature wherein the plate glass blank can be freely supported during the surfacing operations, the said sheet being placed within a recess formed in the supporting table, and includes a protective pad interposed between the bottom of the recess and the sheet of glass being surfaced.

Still another object of the invention is to provide a plate glass blank supporting table comprising a table having preferably adjustable plates carried thereon which form a recess on said table adapted to contain the sheet of glass during the surfacing operations, the said recess having a pad of felt loosely mounted therein so that the sheet can be freely supported thereon during the grinding and polishing thereof.

Other objects and advantages of the invention will become apparent during the course of the following description.

In the drawings wherein like numerals are employed to designate like parts throughout the same, Fig. 1 is a diagrammatic view of a plate glass surfacing machine, Fig. 2 is a fragmentary section through a portion of the table, Fig. 3 is a vertical transverse section through the table showing the protective pad having the same dimensions as the sheet receiving recess, Fig. 4 is a similar view showing a slightly smaller pad, and Fig. 5 is a top plan view of the construction shown in Fig. 4.

The numeral 10 designates the glass supporting table in its entirety and is associated with a pedestal 11 through which runs a shaft upon which the table is rotatably carried. The sheet glass being surfaced is indicated by the numeral 12, while the surfacing tool 13 is adapted to rest upon the sheet and be operated through means of the drive shaft 14. The axis of the surfacing tool is preferably offset from the axis of the table, although both axes may be in alignment while the grinding or polishing tools are carried upon radiating arms.

The table 10 has adjustably associated therewith plates 15 adjustable through means of the screw arrangement 16. A stud 17 is provided with a head 18 adapted to run in the guide-way 19 to prevent accidental displacement of the plates 15 when in use. The inner edges of the plates 15 are provided with removable strips 20 having the protective surfaces 21 thereon.

The four plates 15 define a recess 22 in which the sheet 12 may be positioned during the surfacing operations. As is shown in the drawings, the recess is slightly larger than the sheet of glass being surfaced so that the sheet is free to move within the recess during the grinding and polishing operations.

In order that the surfaces of the sheet will be parallel to each other the bottom of the recess is so formed that it will produce a master surface which will be reproduced upon the plate of glass being ground. To prevent injury to the underside of the sheet while within the recess, a pad of felt 23 is interposed between the sheet of glass and the bottom of the recess. The felt is of substantially the same thickness throughout its entire width, although because of its nature it will adapt itself to permit the sheet to be positioned squarely within the recess. Although felt is mentioned, any similar material can be used. The felt pad is not in any way cemented or fastened within the recess, being placed loosely therein, and as shown in Fig. 4 is permitted to move around within the recess as does the sheet. In Figs. 2 and 3, the felt pad is substantially the same size as the recess so that the amount of movement will be negligible during the surfacing operations. However, by means of the adjustable plates 15, the size of the recess 22 can be regulated as desired so that the lateral movement of the pad 23 can be increased or decreased as preferred. It has been found in actual use that the felt pad does not ball up or wrinkle when loosely mounted within the recess, and in fact a very satisfactory plate of glass is produced when the felt pad is supported within the recess in this manner.

It is to be understood that the form of the invention herewith shown and described is to be taken as the preferred embodiment of the same, and that various changes in the shape, size and arrangement of parts may be restorted to without departing from the spirit of the invention or the scope of the subjoined claim.

I claim:

In sheet glass surfacing apparatus a table having a sheet receiving recess therein, and a pad loosely mounted within the recess for freely supporting the sheet of glass to be surfaced, said recess being of a shape to prevent turning of the pad and sheet therein.

Signed at Toledo, in the county of Lucas, and State of Ohio, this 20th day of June, 1925.

JOHN C. GIPE.